(12) United States Patent
El-Tahlawy et al.

(10) Patent No.: US 12,485,644 B2
(45) Date of Patent: Dec. 2, 2025

(54) LAMINATED ADHESIVE TAPE AND COMPOSITION THEREFOR

(71) Applicant: Andover Healthcare, Inc., Salisbury, MA (US)

(72) Inventors: Khaled El-Tahlawy, Portsmouth, NH (US); Thomas S. Murphy, Hillsboro Beach, FL (US)

(73) Assignee: Andover Healthcare, Inc., Salisbury, MA (US)

( * ) Notice: Subject to any disclaimer, the term of this patent is extended or adjusted under 35 U.S.C. 154(b) by 605 days.

(21) Appl. No.: 17/829,677

(22) Filed: Jun. 1, 2022

(65) Prior Publication Data

US 2022/0288889 A1 Sep. 15, 2022

Related U.S. Application Data

(63) Continuation of application No. 15/402,416, filed on Jan. 10, 2017, now abandoned.

(Continued)

(51) Int. Cl.
*B32B 5/26* (2006.01)
*B32B 5/02* (2006.01)
(Continued)

(52) U.S. Cl.
CPC ............ *B32B 5/26* (2013.01); *B32B 5/022* (2013.01); *B32B 5/026* (2013.01); *B32B 7/06* (2013.01); *B32B 7/12* (2013.01); *B32B 37/12* (2013.01); *C09J 7/29* (2018.01); *C09J 131/04* (2013.01); *B32B 37/0038* (2013.01); *B32B 37/20* (2013.01); *B32B 38/10* (2013.01); *B32B 2250/02* (2013.01); *B32B 2250/03* (2013.01); *B32B 2250/04* (2013.01); *B32B 2250/20* (2013.01); *B32B 2250/40* (2013.01); *B32B 2255/02* (2013.01); *B32B 2255/26* (2013.01); *B32B 2260/021* (2013.01); *B32B 2260/023* (2013.01); *B32B 2260/046* (2013.01); *B32B 2262/0253* (2013.01); *B32B 2262/0276* (2013.01); *B32B 2305/07* (2013.01); *B32B 2307/4026* (2013.01);

(Continued)

(58) Field of Classification Search
CPC ........... B32B 5/26; B32B 5/022; B32B 5/026; B32B 7/12
See application file for complete search history.

(56) References Cited

U.S. PATENT DOCUMENTS 5,762,623 A 6/1998 Murphy
6,156,424 A 12/2000 Taylor
(Continued)

OTHER PUBLICATIONS

WO 9015834 A1. Thone, Gerd Dec. 27, 1990. English Abstract. 1 page. (Year: 1990).

*Primary Examiner* — Jenna L Johnson
(74) *Attorney, Agent, or Firm* — Brenda D. Amidon

(57) ABSTRACT

A laminated adhesive tape includes a substrate comprising two or more plies of thin, flexible material, the substrate having a first major surface and a second major surface opposite the first major surface. A polymeric laminating composition comprising a polymer and an alkyl ketene dimer binds the two or more plies and a pressure sensitive adhesive carried on the first major surface. In a further aspect, a method of making a laminated adhesive tape is provided.

13 Claims, 4 Drawing Sheets

Related U.S. Application Data

(60) Provisional application No. 62/278,827, filed on Jan. 14, 2016.

(51) Int. Cl.
  *B32B 7/06* (2019.01)
  *B32B 7/12* (2006.01)
  *B32B 37/12* (2006.01)
  *C09J 7/29* (2018.01)
  *C09J 131/04* (2006.01)
  *B32B 37/00* (2006.01)
  *B32B 37/20* (2006.01)
  *B32B 38/10* (2006.01)

(52) U.S. Cl.
  CPC ..... *B32B 2307/404* (2013.01); *B32B 2307/41* (2013.01); *B32B 2307/412* (2013.01); *B32B 2307/414* (2013.01); *B32B 2307/582* (2013.01); *B32B 2307/718* (2013.01); *B32B 2307/7265* (2013.01); *B32B 2307/73* (2013.01); *B32B 2405/00* (2013.01); *C09J 2301/122* (2020.08); *C09J 2301/302* (2020.08); *C09J 2400/263* (2013.01); *C09J 2423/046* (2013.01); *C09J 2423/106* (2013.01); *C09J 2431/006* (2013.01); *C09J 2467/006* (2013.01)

(56) References Cited

U.S. PATENT DOCUMENTS

| | | | |
|---|---|---|---|
| 7,317,053 B1* | 1/2008 | Gelman | C23C 22/34 |
| | | | 525/185 |
| 7,854,716 B2* | 12/2010 | Schuren | A61F 13/08 |
| | | | 602/53 |
| 8,779,230 B2 | 7/2014 | Murphy | |
| 2005/0158539 A1 | 7/2005 | Murphy | |
| 2006/0073328 A1 | 4/2006 | Murphy | |
| 2006/0154546 A1 | 7/2006 | Murphy | |
| 2007/0259163 A1 | 11/2007 | Connolly | |
| 2007/0299383 A1 | 12/2007 | Murphy | |
| 2008/0014386 A1 | 1/2008 | Murphy | |
| 2008/0014387 A1 | 1/2008 | Murphy | |
| 2008/0031931 A1 | 2/2008 | Gunn | |
| 2009/0075024 A1* | 3/2009 | Cosack | C23C 14/54 |
| | | | 204/192.15 |
| 2009/0075042 A1 | 3/2009 | Murphy | |
| 2010/0055157 A1 | 3/2010 | Gunn | |
| 2012/0238933 A1 | 9/2012 | Murphy | |
| 2013/0085435 A1 | 4/2013 | Murphy | |
| 2016/0145406 A1* | 5/2016 | Bieber | C09J 123/16 |
| | | | 521/91 |
| 2016/0166440 A1 | 6/2016 | El-Tahlawy | |
| 2017/0203541 A1 | 7/2017 | El-Tahlawy | |
| 2017/0321062 A1 | 11/2017 | Murphy | |

* cited by examiner

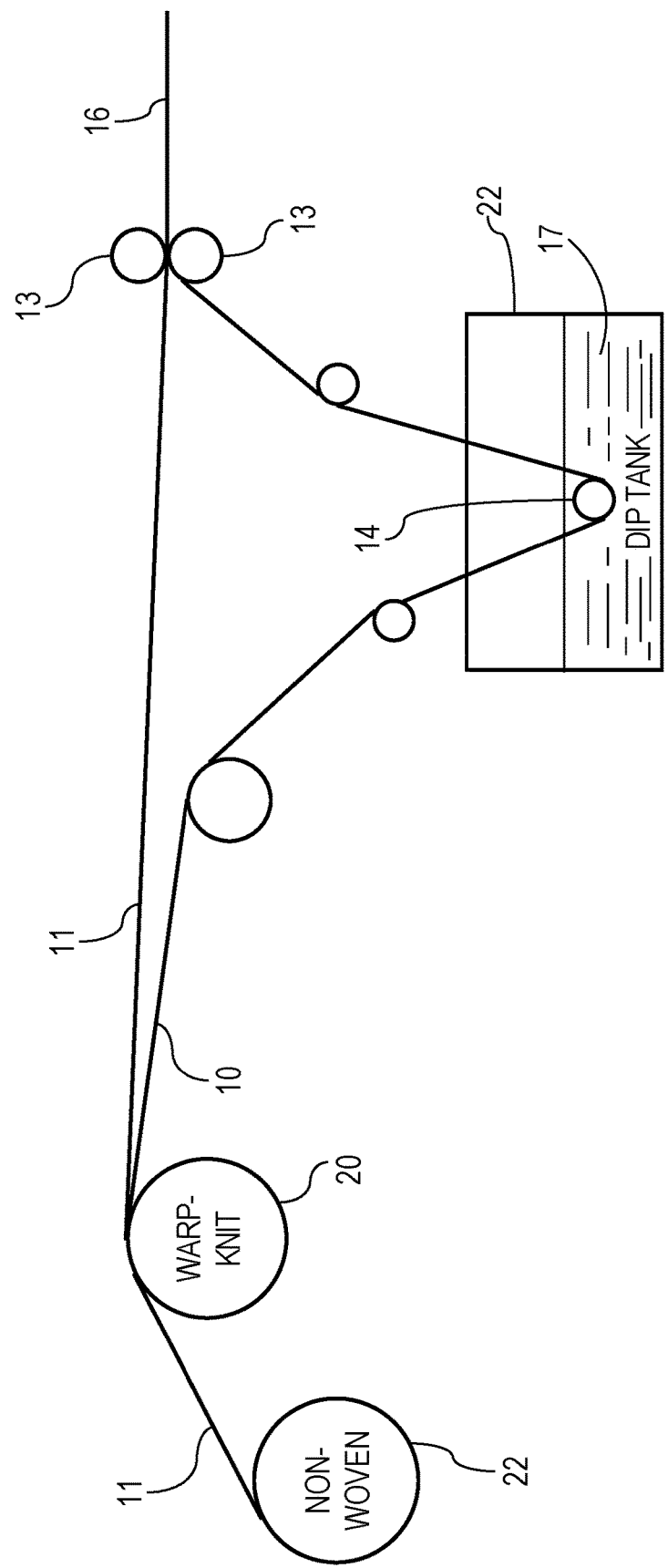

LAMINATED ADHESIVE TAPE AND COMPOSITION THEREFOR

CROSS REFERENCE TO RELATED APPLICATIONS

This application claims priority to and is a continuation of U.S. patent application Ser. No. 15/402,416 filed Jan. 10, 2017, which claims priority to U.S. Provisional Application No. 62/278,827 filed Jan. 14, 2016. The aforementioned applications are incorporated herein by reference in their entirety.

BACKGROUND

The present disclosure relates to pressure-sensitive adhesive tapes and, in particular, to an improved laminated tape construction and laminating composition comprising a polymer containing an alkyl ketene dimer (AKD) for binding the multiple layers. The present invention will be described herein by way of reference to the presently preferred embodiments wherein the tape construction is useful for medical, surgical, athletic (strapping) tape applications. However, it will be recognized that the present development is also amenable to other tape applications.

Pressure-sensitive adhesive tapes are old and well known in the art. Such tapes have two principal components, namely, a normally tacky pressure-sensitive adhesive and a substrate or backing to support the adhesive. Multiple layered adhesive tapes are also known in the art wherein the materials used for the layers are selected based on the requirements of the taping application. For tape applications where the tape is likely to be overlapped during use, (such as applications where the tape is applied to a human or animal body part), such tape must be designed to be self-adherent, i.e., so that the adhesive surface adheres to the non-adhesive surface of the substrate. However, such tapes are typically sold in the form of a roll wherein the adhesive side of the tape is pressed tightly against the non-adhesive surface of the adjacent convolution of the tape on the roll. Therefore, the self-adhesion must not be so great so as to make the tape difficult to unwind from the roll.

As such, it is usually necessary to provide a backsize or release coating containing a release agent in addition to the principal backing and adhesive layers. A release agent is typically incorporated into a backsize composition applied to the nonadhesive surface of the substrate. Alternatively, a release agent may be applied as a top coating over the backsize. See, for example, U.S. Pat. No. 3,342,625 at column 1, lines 54-60.

The present disclosure contemplates a new and improved pressure-sensitive adhesive tape and method which provides a good balance between self-adhesion and quick release/unwind characteristics without the need for a separate release coating.

SUMMARY

In one aspect, a laminated adhesive tape includes a substrate comprising two or more plies of thin, flexible material, the substrate having a first major surface and a second major surface opposite the first major surface. A polymeric laminating composition comprising a polymer and an alkyl ketene dimer binds the two or more plies and a pressure sensitive adhesive carried on the first major surface.

In another aspect, a method of making a laminated adhesive tape includes drawing a first layer of backing material from a supply thereof and passing the first layer through a bath of a laminating composition comprising a polymer and an alkyl ketene dimer to produce a coated layer. A second layer of backing material is drawn from a supply thereof. The coated layer and the second layer are passed through a nip of cooperating nip rollers to produce a multi-ply substrate. The multi-ply substrate is dried and a pressure sensitive adhesive is applied to at least one surface of the multi-ply substrate.

BRIEF DESCRIPTION OF THE DRAWING

The invention may take form in various components and arrangements of components, and in various steps and arrangements of steps. The drawings, which are not necessarily to scale, are only for purposes of illustrating preferred embodiments and are not to be construed as limiting the invention.

DETAILED DESCRIPTION OF THE PREFERRED EMBODIMENTS

Figure 1B:
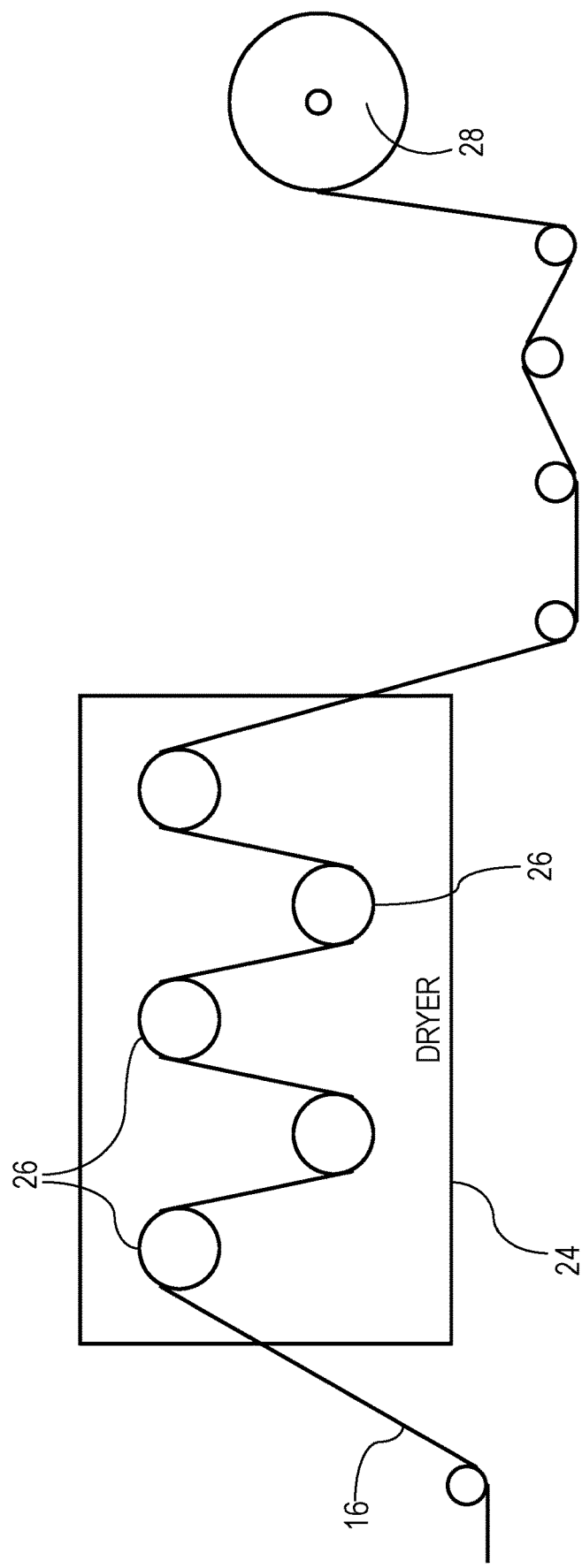
FIG. 1 (comprising FIGS. 1A and 1B) illustrates a schematic diagram of an apparatus for manufacturing a multi-layered pressure-sensitive adhesive tape in accordance with a first exemplary embodiment of the present invention.

The tape construction in accordance with this disclosure includes a substrate or substrate comprising a plurality of laminated plies and a pressure sensitive adhesive (PSA) coating applied to one major surface. It is not necessary to apply a release coating or backsize to the major surface of the substrate opposite the adhesive coating. The number of plies in the laminate is preferably 2 or 3, although other number of plies are also contemplated.

Referring to FIG. 1, in certain embodiments, the multi-layer adhesive tape is composed of a two layer substrate and a polymeric laminating composition comprising AKD is applied to at least one layer of material. Preferably, the laminating composition is applied to the at least one layer of the two-ply substrate using a dip and nip coating process. AKD is a waxy material and can be applied in the form of an emulsion.

In certain embodiments, a layer of warp-knit material 10, comprised for example, of polyester, is unwound from a supply roll 20, and using a series of rollers, is passed under a roller 14 submerged beneath the level of the laminating composition 17 in a bath (e.g., a dispersion bath of the polymer containing the AKD) in dip tank 15. The coated warp-knit material 10 exits the dip tank 15. Concurrently, a layer of nonwoven material 11, comprised, for example, of polypropylene, is unwound from a supply roll 22 and meets the coated warp-knit material at least prior to entering the nip of a pair of nip rollers 13. It is noted that in alternative embodiments, each layer of the two-layer substrate may be any other material suitable for use in tape constructions and taping applications. In preferred embodiments, each layer of the two-layer substrate is formed of a hand-tearable material.

The warp-knit material 10 and nonwoven material 11 upon passing through the nip rollers then pass to a dryer 24, as shown in FIG. 1B, which may include heating elements, fans, and so forth, for evaporating the water or other solvent component from the laminating composition that has been coated or impregnated onto the material to form a laminated material 16. After drying, the laminated material 16 may pass directly to a processing machine for application of the PSA 12 or may be wound onto wind up roller 28 for later application of the PSA coating in a separate step. Preferably, the PSA is applied to the warp-knit side of the laminate.

Figure 2:
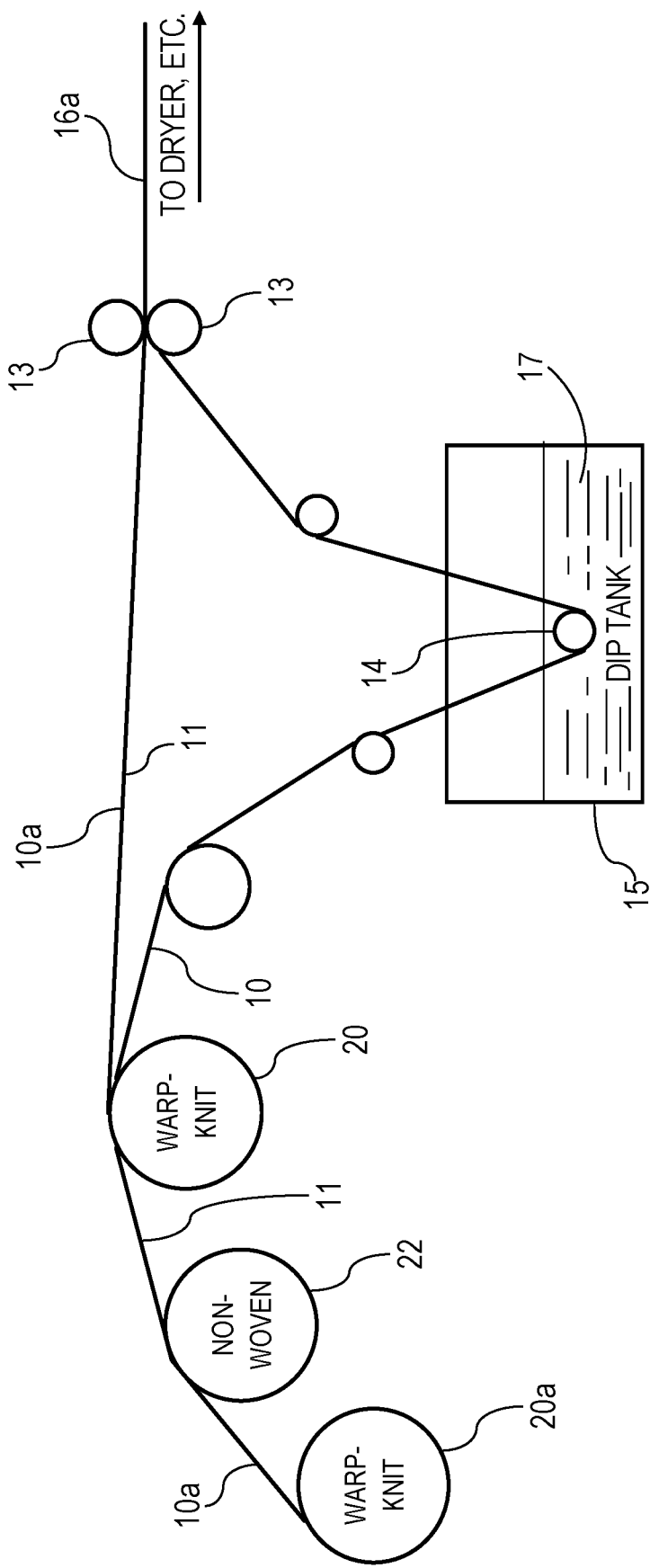
FIG. 2 illustrates a schematic diagram of an apparatus for manufacturing a multi-layered pressure-sensitive adhesive tape in accordance with a second exemplary embodiment of the present invention.
Figure 3:
FIG. 3 is a side view of a roll of the tape 30 formed in accordance with the present disclosure.
Figure 5:
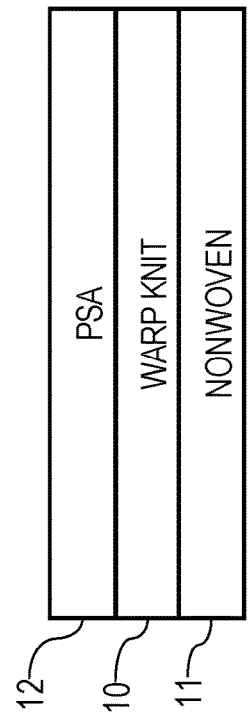
FIG. 5 is a fragmentary cross-sectional view of a strip of multi-layered pressure-sensitive adhesive tape showing the arrangement of layers in accordance with a second exemplary embodiment of the present application.

Referring now to FIG. 2, in alternative embodiments, the multi-layer tape is composed of three layers of material and a polymeric laminating composition containing AKD is applied to at least one layer of material using a dip and nip coating process. In certain embodiments, a first layer of warp-knit material 10, comprised, for example, of polyester, is unwound from a supply roll 20, and using a series of rollers, is passed under a roller 14 in a dip tank 15 containing the laminating composition. The coated warp-knit material 10 exits the dip tank 15. Concurrently, a layer of nonwoven material 11, comprised, for example, of polypropylene, is unwound from a supply roll 22 and meets the coated first layer of warp-knit material at least prior to entering the nip of a pair of nip rollers 13 and a second layer of warp knit material 10a is unwound from a supply roll 20a and meets the coated warp-knit material at least prior to entering the nip of the nip rollers 13. In the illustrated preferred embodiment, the non-woven layer 11 is disposed between the first and second warp knit layers 10 and 10a, as shown in FIG. 5. It is noted that in alternative embodiments, each layer of the three-layer substrate may be any other material suitable for use in tape constructions and taping applications. In preferred embodiments, each layer of the three-layer substrate is formed of a hand-tearable material.

The two layers of warp-knit material 10, 10a and the layer of nonwoven material 11, upon passing through the nip rollers produce a laminated backing construction 16a which passes to a dryer as described above for evaporating the water or other solvent compound from the laminating composition to form a 3 layer laminate. After drying, the laminated material may pass directly to a processing machine for application of the PSA 12 or may be wound onto a roll for later application of the PSA coating in a separate step.

In certain embodiments employing a 3 layer laminate backing or substrate, the coating weight of the AKD-containing laminating composition layer is preferably in the range of from about 20-100 g/m$^2$ (after drying), more preferably from about 70-85 g/m$^2$. In alternative embodiments employing the 2 layer laminate backing, the coating weight of the AKD-containing laminating composition layer is preferably in the range of from about 40-100 g/m$^2$, more preferably from about 60-70 g/m$^2$.

Figure 4:
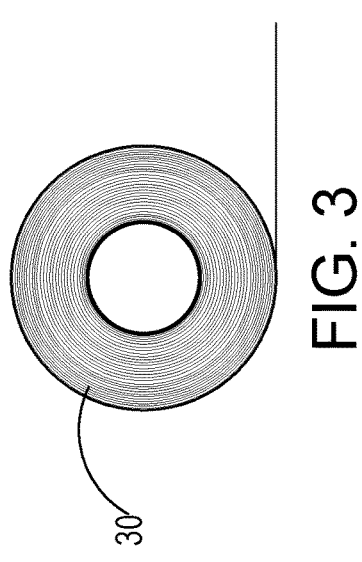
FIG. 4 is a fragmentary cross-sectional view of a strip of multi-layered pressure-sensitive adhesive tape showing the arrangement of layers in accordance with a first exemplary embodiment of the present application.

Referring now to FIG. 4, the PSA is shown as applied to a surface of the warp-knit material which is bound on an opposing surface to a nonwoven material. In preferred embodiments employing a two-layer substrate, the adhesive is coated using a Gaston foaming process.

Referring now to FIG. 5, the PSA is shown as applied to a first layer of nonwoven material which is bound to one side of a layer of warp-knit material. The layer of warp-knit material is bound to another layer of nonwoven material on the opposite side. In preferred embodiments employing a three-layer substrate, the adhesive is coated using knife over the roll coating method.

The adhesive consists of a pressure-sensitive adhesive (PSA) and is preferably of a type which is removable/repositionable and exhibits low skin irritability. Exemplary pressure-sensitive adhesives include, for example, acrylate adhesive, silicone adhesive, silicone acrylic copolymer adhesive, and styrene butadiene rubber (SBR). Representative commercially available pressure-sensitive adhesives include ACRONAL 4032 and ACRONAL A220 available from BASF.

In certain embodiments, the pressure sensitive adhesive is mixed with one or more one additives including tackifiers, surfactants, oils, thickeners, and/or colorants. Exemplary tackifiers include, for example, terpene phenolics, rosins, rosin esters, hydrogenated rosin esters, synthetic hydrocarbon resins, and combinations thereof. Exemplary surfactants include UNIFROTH 1672 available from Unichem Inc. of Haw River, North Carolina and Greenville, South Carolina. Exemplary rosin ester tackifiers are AQUATAC 6085 and AQUATAC 6025 both available from Arizona Chemical of Savannah, Georgia, and Jacksonville, Florida. Exemplary oils include SEMTOL 350 available from Sonneborn of Petrolia, Pennsylvania. Exemplary thickeners include PARAGUM thickeners available from Para-Chem of Dalton, Georgia.

In the preferred embodiment, the adhesive coating is applied to the surface of the laminated AKD material 16 by foaming the adhesive formula using a Gaston foam processing machine to produce very small/fine foam PSA particles on the surface of the substrate. The adhesive foam particles are characterized by its higher surface area, lower density, higher porosity and opaque foam structure compared to traditional coating techniques, such as a knife coating (e.g., knife over roll, etc.). The advantage of using the foam coating technique is to produce a highly uniform coating of the PSA across the substrate even at low coating weights. In certain embodiments, the coating weight of the adhesive coating layer is preferably in the range of from about 40-110 g/m$^2$, more preferably from about 60-80 g/m$^2$. In alternative embodiments, the coating weight of the adhesive coating latter is 35-90 g/m$^2$, more preferably from about 55-75 g/m$^2$. It will be recognized, however, that other methods for coating the adhesive, such as spray coating, knife coating, and the like are also contemplated.

It has been found that the AKD incorporated throughout laminated AKD material provides release properties to the tape construction to make it easy to unwind tape from the roll, thereby eliminating the need for a separate backsize or release layer on the opposite surface of the substrate. The incorporation of AKD into the laminating polymer composition also provides hydrophobicity and in certain embodiments has been found to impart water resistance to the tape product s in accordance with this disclosure.

The laminating composition includes a polymer and AKD. A preferred laminating composition comprises AKD admixed with a copolymer of vinyl acetate and ethylene (VAE). Optionally, the laminating composition further includes an antioxidant. AKD having a melting point that is greater than 50 degrees C. is preferred. A suitable AKD composition is AQUAPEL 1000, available from Solenis LLC of Wilmington, Delaware. Suitable VAE compositions include VINNAPAS 323 and VINNAPAS 920, both available from Wacker Chemie AG of Allentown, Pennsylvania. A suitable antioxidant is BOSTEX 537 available from Akron Dispersions of Akron, Ohio.

In especially preferred embodiments, the laminated AKD material is transparent or translucent and a colored tape may be provided by incorporating one or more colorants into the adhesive composition such that the colorant in the adhesive layer can be transvisualized through the transparent or translucent substrate. As the colorant, any suitable coloring agent may be employed, and may be included in the adhesive formulation as a colorant dispersion. Preferred colorants are water insoluble. Examples are dyes and pigments, both aqueous and organic. Non-limiting examples of such colorants are AURORA PINK SPL-11N, available from Day-Glo Color Corp. of Cleveland, Ohio or Blue 15N40 available from Poly/Sperse Corp. Other commercially available pigments may also be used including green, teal, yellow, and so forth. It will be recognized that any desirable color can be achieved with the appropriate selection and/or combination of pigments or dyes. Preferably, the coloring agents exhibit low skin irritability.

It has also been found that tape used in the medical and surgical fields with transparency or translucency is beneficial and useful in enabling the relevant medical professionals to observe the status of the patient's wounds or progress underneath the tape. Furthermore, such tape may be used to cover and hold down intravenous needles, and the use of transparent or translucent tape allows the medical professionals to observe the needle's status relevant to the patient's skin.

Figure 6:
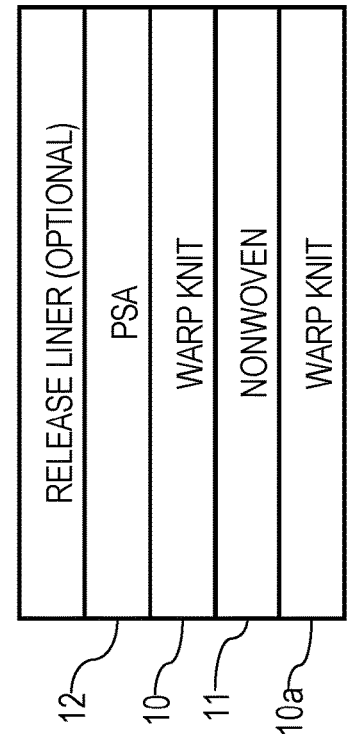
FIG. 6 is a side view of a pressure-sensitive adhesive tape construction having a two-layer substrate configured as a strip.
Figure 7:
FIG. 7 is a side view of a pressure-sensitive adhesive tape construction having a three-layer substrate configured as a strip.

Although the tape in accordance with the present disclosure has been described herein primarily by way of reference to the preferred configuration of a roll, it will be recognized that the tape herein may also be configured as a strip, as shown in FIGS. 6 and 7, and which may otherwise be as described above. An example embodiment of a pressure-sensitive adhesive tape may be configured as a tape strip having a desired length and width comprising a laminated AKD material having a first major surface and a second major surface which is opposite the first major surface. The laminated AKD material is coated on the first major surface with an adhesive coating.

In embodiments wherein the laminated tape constructions herein are to be used in the form of a sheet or strip, a release liner 18 is preferably removably adhered to the adhesive layer 12 to protect the adhesive layer prior to use. The adhesive-contacting surface of the release liner 18 may be treated with a release agent such as a silicone or fluorosilicone release agent to prevent the adhesive layer 12 from aggressively adhering to the release liner.

Such strips can be packaged as individually wrapped strips, which is advantageous for use in applications where it is desirable for the tape to remain sterile until use. In certain embodiments, such strips are packaged together in packs comprising multiple (e.g., individually wrapped) strips. In certain embodiments, packages of tape strips comprising plurality lengths and/or widths are provided.

EXAMPLES

In certain embodiments, the AKD is introduced into a layer of material as a formulation containing AKD and a vinyl acetate ethylene copolymer (VAE). The concentration of AKD preferably varies from 5-30% by weight based on dry solids in the polymer laminating composition. The polymeric laminating composition may also contain an antioxidant in the amount of 0.10-10% by weight based on dry solids in the polymer laminating composition.

Laminating AKD Composition—Embodiments Employing Three Layer Laminate Backing (Strapping Tape):

An exemplary laminating AKD composition is prepared by admixing the following:

| Ingredient | Amount (lbs.) |
|---|---|
| VINNAPAS 920 (VAE) | 244.9 |
| VINNAPAS 323 (VAE) | 12.9 |
| AQUAPEL 1000 (AKD) | 86.2 |
| BOSTEX 537 (Antioxidant) | 6.0 |
| TOTAL | 350.0 |

Laminating AKD Composition—Embodiments Employing Two Layer Laminate Backing (Medical Tape):

An exemplary laminating AKD composition is prepared by admixing the following:

| Ingredient | Amount (lbs.) |
|---|---|
| VINNAPAS 920 (VAE) | 184.9 |
| VINNAPAS 323 (VAE) | 79.2 |
| AURORA PINK SPL11N (Colorant) | 2.7 |
| AQUAPEL 1000 (AKD) | 76.6 |
| BOSTEX 537 (Antioxidant) | 6.6 |
| TOTAL | 350 |

Adhesive Formulation Example—Embodiments Employing a Two Layer Laminate Backing:

In certain embodiments, pressure sensitive adhesive formulation was prepared by admixing the following:

| Ingredient | Amount (lbs.) |
|---|---|
| ACRONAL 4032 (Acrylic dispersion) | 169.6 |
| ACRONAL A220 (Acrylic dispersion) | 113.1 |
| AQUATAC 6085 (Tackifier) | 19.8 |
| UNIFROTH 1672 (Surfactant) | 2.5 |
| SEMTOL 350 (Oil) | 1.2 |
| PARAGUM 184 (Thickener) | 10.4 |
| WATER | 33.3 |
| TOTAL | 350.0 |

Adhesive Formulation Example—Embodiment Employing a Three Layer Laminate Backing:

In alternative embodiments, a pressure sensitive adhesive formulation was prepared by admixing the following:

| Ingredient | Amount |
|---|---|
| ROVENE 9410 (Styrene butadiene latex) | 198.9 g |
| ROVENE 9423 (Styrene butadiene latex) | 66.3 g |
| Rosin Ester Tackifier I (TACOLYN 5085) | 42.4 g |
| Rosin Ester Tackifier II (AQUATEC 6025) | 113.5 g |
| PARAGUM 500 (Thickener) | 3.9 g |
| Total | 425 g |

The adhesive formulation is coated onto one side of the laminated AKD material. The PSA coated tape is then rolled to form a large rolls of materials (logs) having a desired length. The logs are then slitted, e.g., via log slitting or rewind slitting, to form rolls of tape having desired widths.

Test Results

The tape in accordance with the present disclosure was tested for front-to-back peel force (PFB). A PFB test was performed in accordance with ASTM D1876-08, *Standard Test Method for Peel Resistance of Adhesives* (*T-Peel Test*). The results of the PFB tests appear in the tables below The tape was also tested for peel adhesion to a standard stainless steel surface (PSS) in accordance with ASTM D6252/D6252M-98, *Standard Test Method for Peel Adhesion of Pressure-Sensitive Label Stocks at a 90° Angle*. The results of the PFB and PSS tests appear in the tables below.

Test Results Corresponding to Certain Embodiments Employed a Two Layer Laminate Backing:

| | Performance Properties | | |
|---|---|---|---|
| Formulation | Coating weight, g/m² | Peel Front to back, oz./in | Peel to Stainless steel, oz./in |
| Sample 1 | 40 | 7.1 | 12.1 |
| Sample 2 | 48 | 8.2 | 15.1 |
| Sample 3 | 40 | 7.3 | 12.7 |

Test Results Corresponding to Alternative Embodiments Employed a Three Layer Laminate Backing:

| | Performance Properties | | |
|---|---|---|---|
| Formulation | Coating weight, g/m² | Peel Front to back, oz./in | Peel to Stainless steel, oz./in |
| Sample 1 | 82 | 13.3 | 40.8 |
| Sample 2 | 64 | 10 | 36.6 |
| Sample 3 | 77 | 12.2 | 39.3 |

The test data demonstrate that the pressure-sensitive adhesive tape according to the present disclosure provides a good self-adhesion and surface adhesion, while also having excellent unwind characteristics without the need for a separate release coating or backsize on the nonadhesive surface of the tape.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

The invention claimed is:

1. A laminated adhesive tape comprising:
   (a) a substrate comprising a first ply of warp-knit material and a second ply of nonwoven material, the first ply having a first major surface and the second ply having a second major surface;
   (b) a polymeric laminating composition comprising:
      (i) a copolymer of vinyl acetate and ethylene (VAE),
      (ii) an alkyl ketene dimer, and
      (iii) an antioxidant; and
   (c) a foamed pressure sensitive adhesive carried on the first major surface;
   wherein the laminated adhesive tape is free from a coating release layer;
   wherein the laminated adhesive tape is hand tearable.

2. The laminated adhesive tape of claim 1, wherein said warp-knit material is formed of a polyester and said nonwoven material is formed of polypropylene.

3. The laminated adhesive tape of claim 1, wherein the first ply is impregnated with the polymeric laminating composition.

4. The laminated adhesive tape of claim 1, wherein the coating weight of the polymeric laminating composition is in the range of 40 to 100 g/m².

5. The laminated adhesive tape of claim 1, wherein the polymeric laminating composition contains from 5-30% of the alkyl ketene dimer by weight after drying.

6. The laminated adhesive tape of claim 1, wherein the substrate further includes:
   the first ply having a first surface defining the first major surface and a second surface opposite the first surface;
   the second ply directly contacting the second surface of the first ply; and
   a third ply having a first surface directly contacting the second ply and a second surface opposite the first surface.

7. The laminated adhesive tape of claim 6, wherein said third ply is formed of a warp-knit material.

8. The laminated adhesive tape of claim 6, wherein said first ply and said third ply are formed of a polyester and said second ply is formed of polypropylene.

9. The laminated adhesive tape of claim 6, wherein the first ply is impregnated with the polymeric laminating composition.

10. The laminated adhesive tape of claim 6, wherein the coating weight of the polymeric laminating composition is in the range of 20 to 100 g/m².

11. The laminated adhesive tape of claim 1, wherein said pressure sensitive adhesive is selected from the group consisting of acrylate, silicone, silicone acrylic copolymer, and styrene butadiene rubber adhesives.

12. The laminated adhesive tape of claim 11, wherein the pressure sensitive adhesive comprises one or more of a tackifier, a surfactant, and a colorant.

13. The laminated adhesive tape of claim 1, wherein the laminated adhesive tape is rolled up into a roll.

* * * * *